(12) United States Patent
Lai

(10) Patent No.: US 8,106,542 B2
(45) Date of Patent: Jan. 31, 2012

(54) VARIABLE POWER SOURCE AND RELATED POWER SUPPLY METHOD

(75) Inventor: Chih-Chen Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 225 days.

(21) Appl. No.: 12/558,223

(22) Filed: Sep. 11, 2009

(65) Prior Publication Data
US 2011/0018352 A1    Jan. 27, 2011

(30) Foreign Application Priority Data
Jul. 21, 2009   (CN) .......................... 2009 1 0304572

(51) Int. Cl.
*H02J 7/00*    (2006.01)
(52) U.S. Cl. ...................................................... 307/150
(58) Field of Classification Search ................... 307/150
See application file for complete search history.

(56) References Cited

U.S. PATENT DOCUMENTS
2006/0092583 A1*  5/2006  Alahmad et al. ................ 361/15
* cited by examiner

*Primary Examiner* — Robert L. Deberadinis
(74) *Attorney, Agent, or Firm* — Altis Law Group, Inc.

(57) ABSTRACT

A power source includes a plurality of cells, a positive output, a negative output, a number of positive switches, a number of negative switches, and a number of serializing switches. Each of the cells includes a positive electrode and a negative electrode. Each of the positive switches is for connecting a corresponding positive electrode to the positive output. Each of the negative switches is for connecting a corresponding negative electrode to the negative output. Each of the serializing switches is for connecting a positive electrode of a corresponding cell to a negative electrode of an adjacent cell.

11 Claims, 4 Drawing Sheets

VARIABLE POWER SOURCE AND RELATED POWER SUPPLY METHOD

BACKGROUND

1. Technical Field

The present disclosure relates to power sources and power supply methods and, particularly, to a power source having a number of cells and a power supply method for controlling the power source to supply power.

2. Description of Related Art

Batteries are widely used as power sources. In a typical battery power source, a plurality of batteries is fixedly connected in series or in parallel. Accordingly, an output voltage of the power source is fixed. This kind of power source cannot meet the rated voltage requirements of different loads.

Therefore, it is desirable to provide a power source and a power supply method, which can overcome the above-mentioned problems.

DETAILED DESCRIPTION

Figure 1:
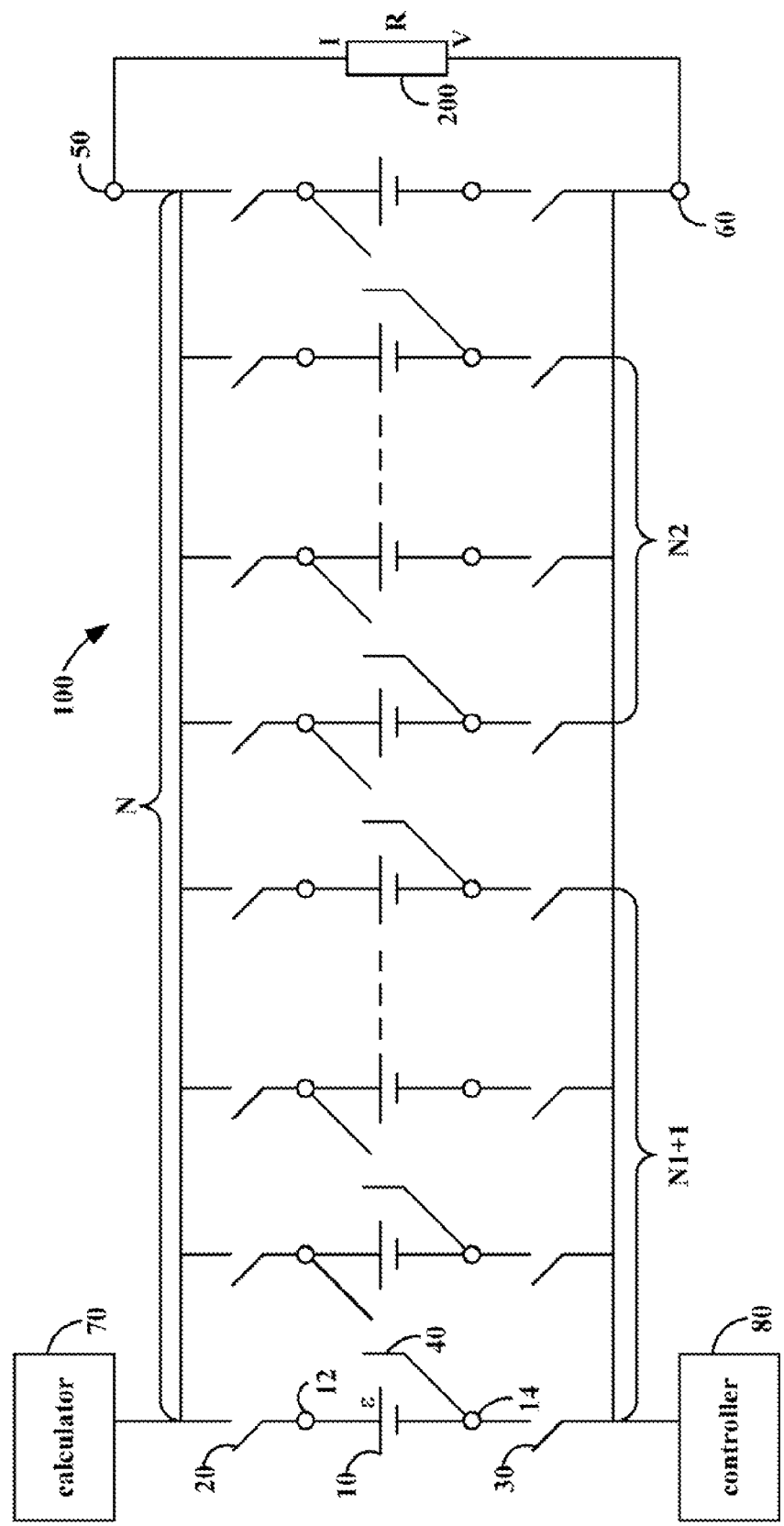
FIG. 1 is a circuit diagram of a power source in accordance with an exemplary embodiment of the present disclosure, showing the power source in a first state.

Referring to FIG. 1, a power source 100, according to an exemplary embodiment, is shown. The power source 100 includes a number of cells 10, a number of positive switches 20, a number of negative switches 30, a number of serializing switches 40, a positive output 50, and a negative output 60. In this embodiment, the number of cells 10 is N, the number of positive switches 20 is N, the number of negative switches 30 is N, and the number of serializing switches 40 is N.

The cells 10 can be dry batteries, rechargeable batteries or solar batteries. Each of the cells 10 includes a positive electrode 12 and a negative electrode 14. An output voltage $\epsilon$ between the positive electrode 12 and the negative electrode 14 is typically fixed.

The positive switches 20, the negative switches 30, and the serializing switches 40 can be, among other types, push-button switches, thin film switches, toggle switches, mercury tilt switches, lever switches, micro switches, or travel switches. In this embodiment, all the positive switches 20, the negative switches 30, and the serializing switches 40 are integrated into a grammed switch.

In assembly, the cells 10 are arranged in parallel. Each of the positive switches 20 connects a positive electrode 12 of a corresponding cell 10 to the positive output 50. Each of the negative switches 30 connects a negative electrode 14 of a corresponding cell 10 to the negative output 60. Each of the serializing switches 40 connects a negative electrode 14 of a corresponding cell 10 to a positive electrode 12 of an adjacent cell 10.

In use, the power source 100 is exemplarily for supplying power to a load 200, such as a gaming device. The load 200 has a resistance R. The rated voltage and rated flow of electrical current are V and I respectively.

Figure 2:
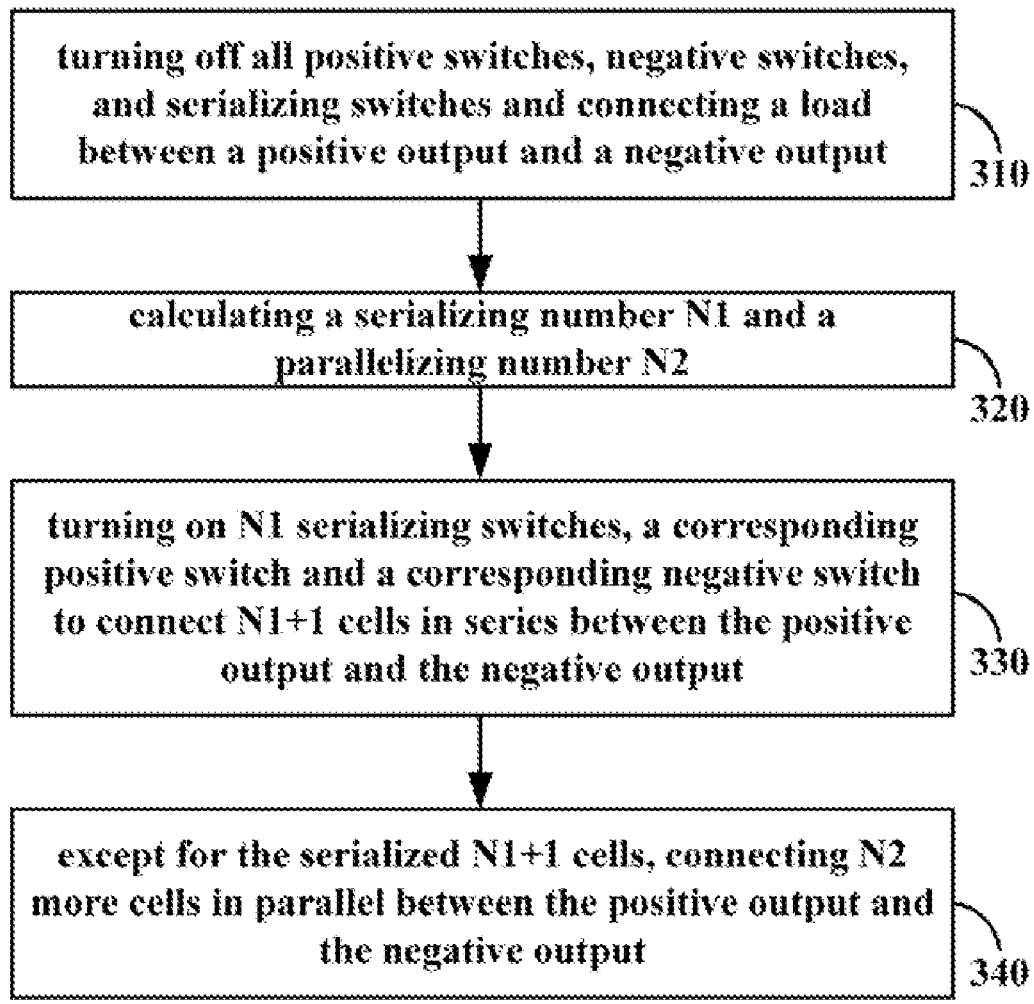
FIG. 2 is a flowchart of a power supply method according to another embodiment of the present disclosure.
Figure 3:
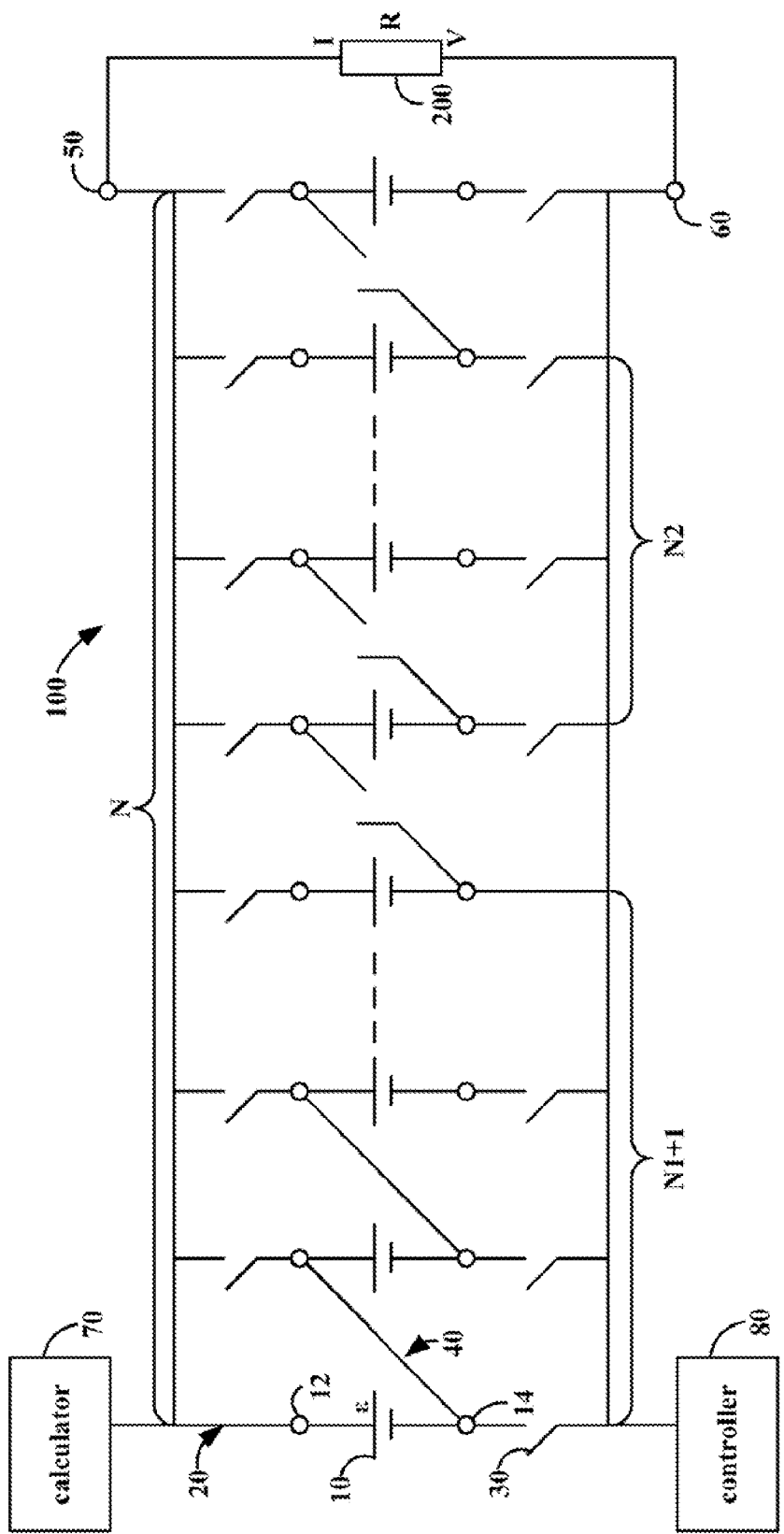
FIG. 3 is similar to FIG. 1, but showing the power source of in a second state.

Also referring to FIG. 2, when the power source 100 is supplying power to the load 200, the following steps 310-340 are carried out.

In step 310, all the positive switches 20, the negative switches 30, and the serializing switches 40 are turned off. The load 200 is connected between the positive output 50 and the negative output 60.

In step 320, a serializing number N1 and a parallelizing number N2 are calculated. In particular, the serializing number N1 and the parallelizing number N2 are calculated using the following two formulas:

$$N1=[V/\epsilon]; \text{and} \qquad (1):$$

$$N2=[IR/\epsilon-N]. \qquad (2):$$

Where $[V/\epsilon]$ represents rounding off $V/\epsilon$, and $[IR/\epsilon-N]$ represents rounding off $(IR/\epsilon-N)$. In the present embodiment, unless the context indicates otherwise, rounding off means simplifying a number with a decimal point to the nearest integer.

Beneficially, the power source 100 may further include a calculator 70 to carry out step 320. In particular, the calculator 70 stores the output voltage $\epsilon$ and the total number N of the cells 10. As such, the resistance R, the rated voltage V, and the rated flow of electrical current I of the load 200 are input to the calculator 70. The serializing number N1 and the parallelizing number N2 can be then determined by the calculator 70.

Also referring to FIG. 2, in step 330, N1 serializing switches 40 are turned on to connect N1+1 cells 10 in series. These N1+1 serialized cells 10 include an unconnected positive electrode 12 and an unconnected negative electrode 14. The positive switch 20 corresponding to the unconnected positive electrode 12 and the negative switch 30 corresponding to the unconnected negative electrode 14 are turned on. As such, the serialized N1+1 cells 10 are connected between the positive output 50 and the negative output 60.

Figure 4:
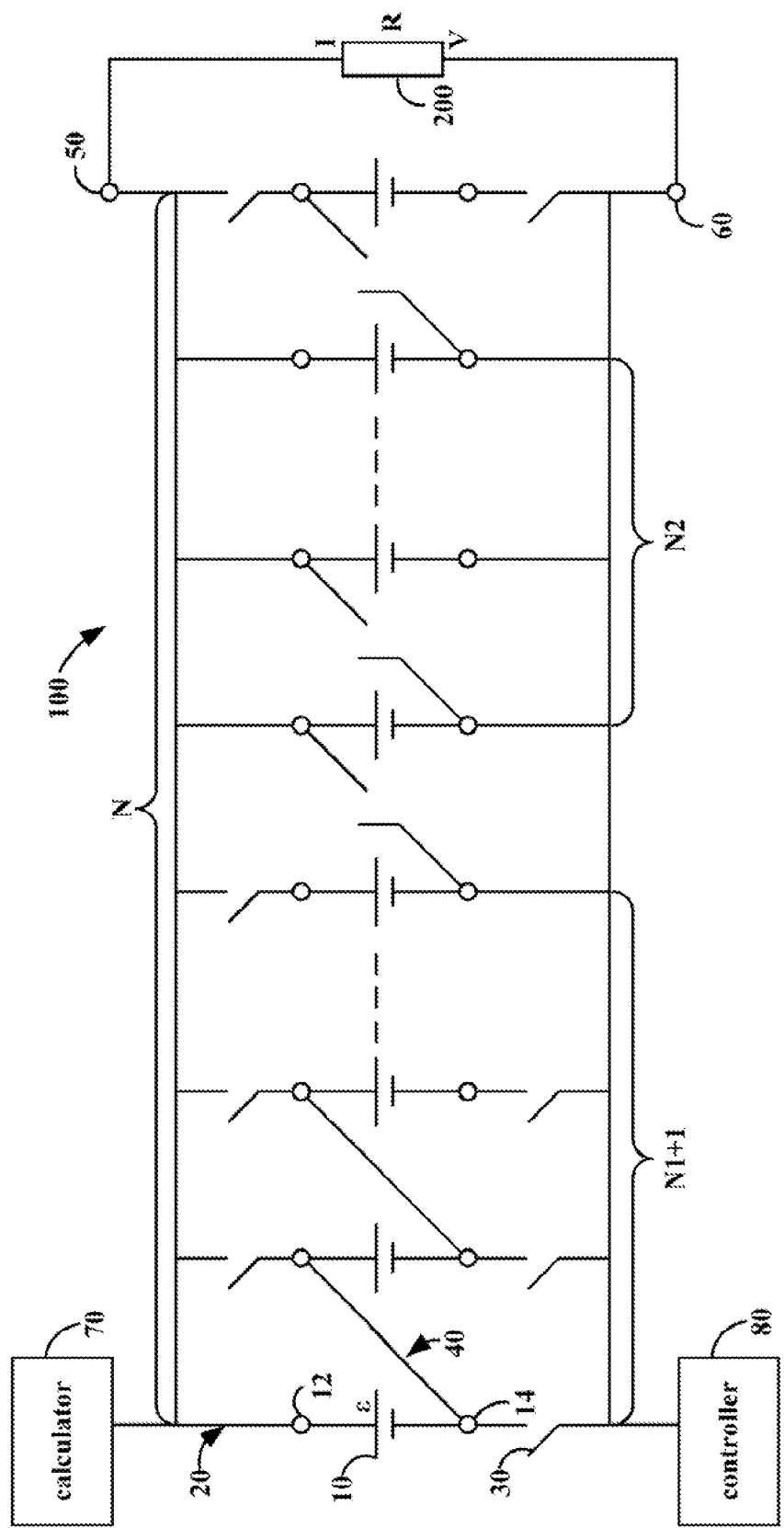
FIG. 4 is similar to FIG. 1, but showing the power source in a third state.

Also referring to FIG. 4, except for the serialized cells 10, N2 more cells 10 are connected in parallel between the positive output 50 and the negative output 60 by turning on the corresponding N2 positive switches 20 and the corresponding N2 negative switches 30.

It should be understood that (N1+N2+1) should be less than N. Otherwise, the power source 100 is incapable of supplying power for the load 200.

Opportunely, the power source 100 can further include a controller 80 that can control grammed switches. Steps 330 and 340 can be carried out by the controller 80.

Based upon the formula (1), it can be determined that the output voltage of the power source 100 is about $(N1+1)\epsilon$, which is equal to or slightly higher than the rated voltage V of the load 200. Based upon both the formulas (1) and (2), it can be inferred that the flow of electrical current through the load 200 is about $(N1+N2+1)\epsilon/R$, which is equal to or slightly higher than the rated flow of electrical current I of the load 200. Both the rated voltage and the rated flow of electrical current requirements of the load 200 are satisfied.

For other loads, the power supply method can calculate corresponding serializing and parallelizing numbers and control the power source 100 to output voltages that meet the rated voltage and rated flow of electrical current requirements of the loads. Therefore, the power source 100 can be applied to various loads.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A power source comprising:
   a positive output;
   a negative output;
   a plurality of cells, each of which comprises a positive electrode and a negative electrode;
   a plurality of positive switches, each of which is for connecting or disconnecting a corresponding positive electrode to the positive output;
   a plurality of negative switches, each of which is for connecting or disconnecting a corresponding negative electrode to the negative output; and
   a plurality of serializing switches, each of which is for connecting or disconnecting a positive electrode of a corresponding cell to a negative electrode of an adjacent cell;
   a calculator configured for calculating a serializing number and a parallelizing number using the following formulas:

$$N1=[V/\epsilon]; \text{and} \quad (1)$$

$$N2=[IR/\epsilon-N], \quad (2)$$

wherein N1 is the serializing number, V is a rated voltage of a load to be connected between the positive output and the negative output, $\epsilon$ is an output voltage of each cell, $[V/\epsilon]$ represents rounding off $V/\epsilon$, N2 is the parallelizing number, I is a rated flow of electrical current of the load, R is a resistance of the load, N is a total number of the cells, $[IR/\epsilon-N]$ represents rounding off $(IR/\epsilon-N)$, and $(N1+N2+1)<N$.

2. The power source of claim 1, wherein the cells are selected from the group consisting of dry batteries, rechargeable batteries, and solar batteries.

3. The power source of claim 1, wherein the positive switches, the negative switches, and the serializing switches are selected from the group consisting of push-button switches, thin film switches, toggle switches, mercury tilt switches, lever switches, micro switches, and travel switches.

4. The power source of claim 1, wherein the positive switches, the negative switches, and the serializing switches are integrated into a grammed switch.

5. The power source of claim 4, further comprising a controller configured for controlling the grammed switch.

6. A power supply method for controlling a power source to supply power for a load, the power source comprising a plurality of cells, a positive output, a negative output, a plurality of positive switches, a plurality of negative switches, and a plurality of serializing switches; each of the cells comprising a positive electrode and a negative electrode; each of the positive switches being for connecting or disconnecting a corresponding positive electrode to the positive output; each of the negative switches being for connecting or disconnecting a corresponding negative electrode to the negative output; each of the serializing switches being configured for connecting or disconnecting a positive electrode of a corresponding cell to a negative electrode of an adjacent cell; the power supply method comprising:
   turning off all the positive switches, the negative switches, and the serializing switches and connecting the load between the positive output and the negative output;
   calculating a serializing number and a parallelizing number using the following formulas: (1): $N1=[V/\epsilon]$; and (2): $N2=[IR/\epsilon-N]$, wherein N1 is the serializing number, V is a rated voltage of the load, $\epsilon$ is an output voltage of each cell, $[V/\epsilon]$ represents rounding off $V/\epsilon$, N2 is the parallelizing number, I is a rated flow of electrical current of the load, R is a resistance of the load, N is a total number of the cells, $[IR/\epsilon-N]$ represents rounding off $(IR/\epsilon-N)$, and $(N1+N2+1)<N$;
   turning on N1 serializing switches to connect N1+1 cells in series, the N1+1 serialized cells comprising an unconnected positive electrode and an unconnected negative electrode, and turning on a positive switch corresponding to the unconnected positive electrode and a negative switch corresponding to the unconnected negative electrode to connect the N1+1 serialized cells between the positive output and the negative output; and
   except for the serialized N1+1 cells, connecting N2 more cells in parallel between the positive output and the negative output by turning on N2 corresponding positive switches and N2 corresponding negative switches.

7. The power supply method of claim 6, wherein the cells are selected from the group consisting of dry batteries, rechargeable batteries, and solar batteries.

8. The power supply method of claim 6, wherein the positive switches, the negative switches, and the serializing switches are selected from the group consisting of push-button switches, thin film switches, toggle switches, mercury tilt switches, lever switches, micro switches, and travel switches.

9. The power supply method of claim 6, wherein the positive switches, the negative switches, and the serializing switches are integrated into a grammed switch.

10. The power supply method of claim 9, wherein the power source comprises a controller configured for controlling the grammed switch to automatically turn on and off the positive switches, the negative switches, and the serializing switches.

11. The power supply method of claim 6, wherein the power source comprises a calculator configured for calculating the serializing number and the parallelizing number.

* * * * *